US012331698B1

(12) United States Patent
Hoffman et al.

(10) Patent No.: US 12,331,698 B1
(45) Date of Patent: Jun. 17, 2025

(54) FASTENING STRUCTURES WITH HIGH COEFFICIENT OF THERMAL EXPANSION FOR REDUCTION OF THERMALLY DRIVEN STRESSES IN SECURING ALUMINUM SILICON ALLOYS

(71) Applicant: Brunswick Corporation, Mettawa, IL (US)

(72) Inventors: Daniel P. Hoffman, Fond du Lac, WI (US); Kevin R. Anderson, Fond du Lac, WI (US); Christopher J. Misorski, Fond du Lac, WI (US); Jeremy J. Dion, Port Washington, WI (US)

(73) Assignee: Brunswick Corporation, Mettawa, IL (US)

( * ) Notice: Subject to any disclaimer, the term of this patent is extended or adjusted under 35 U.S.C. 154(b) by 454 days.

(21) Appl. No.: 15/895,616

(22) Filed: Feb. 13, 2018

(51) Int. Cl.
*F02F 7/00* (2006.01)
*C21D 1/18* (2006.01)
(Continued)

(52) U.S. Cl.
CPC .......... *F02F 7/0021* (2013.01); *C21D 9/0093* (2013.01); *C21D 1/18* (2013.01);
(Continued)

(58) Field of Classification Search
CPC ............ F02F 7/0021; F02F 2007/0041; C21D 9/0093; C21D 1/18; C21D 6/004; C21D 2211/001
See application file for complete search history.

(56) References Cited

U.S. PATENT DOCUMENTS

| | | | | |
|---|---|---|---|---|
| 5,066,179 A * | 11/1991 | Pratt | F16B 19/1054 | 411/34 |
| 6,921,512 B2 * | 7/2005 | Doty | C22C 21/04 | 420/549 |

(Continued)

FOREIGN PATENT DOCUMENTS

| | | |
|---|---|---|
| CN | 204677568 U * | 9/2015 |
| JP | S61276957 A * | 12/1986 |

(Continued)

OTHER PUBLICATIONS

Machine Translation of JP-2009249658-A Pdf file name: "JP2009249658A_Machine_Translation.pdf".*

(Continued)

*Primary Examiner* — Grant Moubry
*Assistant Examiner* — Ruben Picon-Feliciano
(74) *Attorney, Agent, or Firm* — Andrus Intellectual Property Law, LLP

(57) ABSTRACT

A fastening structure for securing two disparate sections of an aluminum silicon alloy product. A precipitation hardenable austenitic stainless steel bolt engages each hole of a first and second aluminum silicon alloy product sections to fasten the sections together. The fastening structure is optimally utilized in a high temperature environment having thermal fluctuations. In such environments, the precipitation hardenable austenitic stainless steel bolt has less than 15% thermal relaxation after thermal fluctuations, and in some embodiments, less than 13% thermal relaxation after thermal fluctuations. The invention is of particular use for the fastening of an engine block crankcase utilized in a high temperature environment having thermal fluctuations where an engine block, a crankcase bedplate and a crankcase cover are formed from AA 362.0 alloy.

8 Claims, 9 Drawing Sheets

(51) Int. Cl.
*C21D 6/00* (2006.01)
*C21D 9/00* (2006.01)

(52) U.S. Cl.
CPC ........ *C21D 6/004* (2013.01); *C21D 2211/001* (2013.01); *F02F 2007/0041* (2013.01)

(56) References Cited

U.S. PATENT DOCUMENTS

| | | | |
|---|---|---|---|
| 6,923,935 B1 | 8/2005 | Donahue et al. | |
| 7,347,905 B1 | 3/2008 | Donahue et al. | |
| 7,666,353 B2 | 2/2010 | Donahue et al. | |
| 8,668,538 B1 | 3/2014 | Langenfeld et al. | |
| 8,820,389 B1 * | 9/2014 | Degler | B22D 19/0009 164/113 |
| 9,109,271 B2 | 8/2015 | Donahue et al. | |
| 9,174,818 B1 | 11/2015 | Langenfeld et al. | |
| 9,234,457 B1 | 1/2016 | Yukioka | |
| 9,457,881 B1 * | 10/2016 | Belter | B63H 20/28 |
| 9,616,987 B1 | 4/2017 | Langenfeld et al. | |
| 9,650,699 B1 | 5/2017 | Donahue et al. | |
| 2007/0187003 A1 * | 8/2007 | Takashima | C22C 38/02 148/320 |
| 2013/0146018 A1 * | 6/2013 | Brautigam | F16C 9/02 123/195 R |
| 2018/0163599 A1 * | 6/2018 | Ozaki | B01J 37/0225 |

FOREIGN PATENT DOCUMENTS

| | | | |
|---|---|---|---|
| JP | H1190676 A | * | 4/1999 |
| JP | 2009249658 A | * | 10/2009 |

OTHER PUBLICATIONS

Machine Translation of CN-204677568-U Pdf file name: “CN204677568U_Machine_Translation.pdf”.*
Machine Translation of JPH1190676A PDF File Name: “JPH1190676A_Machine_Translation.pdf”.*
Machine Translation of JPS61276957A PDF File Name: “JPS61276957A_Machine_Translation.pdf”.*
Unpublished U.S. Appl. No. 15/363,280, filed Nov. 29, 2016.
Michael A. DeJack et al., Bolt Load Relaxation and Fatigue Prediction in Threads with Consideration of Creep Behavior for Die Cast Aluminum, #2010-01-0965, SAE International, published Apr. 12, 2010.

* cited by examiner

FASTENING STRUCTURES WITH HIGH COEFFICIENT OF THERMAL EXPANSION FOR REDUCTION OF THERMALLY DRIVEN STRESSES IN SECURING ALUMINUM SILICON ALLOYS

FIELD

The present disclosure generally relates to fasteners and fastening structures for aluminum silicon alloys, and more particularly to fasteners and fastening structures utilized in aluminum silicon alloy engines.

BACKGROUND

The reduction of engine weight is a driving force in the transportation industry. The U.S. uses more energy for transportation than any other segment of the economy. Engine weight reduction directly results in fuel savings and greenhouse gas reduction. In boating applications, other important attributes such as range, top speed, acceleration, and boat stability can be improved by reducing the engine weight.

Many engine manufacturers are converting from cast iron to aluminum silicon alloy blocks and heads for weight reduction. This conversion creates a weight savings, primarily due to using the lower density aluminum material. Within an aluminum engine, the architecture of the engine block itself also significantly influences total engine weight.

U.S. Pat. Nos. 6,923,935, 7,347,905, and 7,666,353 disclose strontium containing aluminum silicon alloys that have refined primary silicon particle size and a modified iron morphology. The strontium serves to modify the silicon eutectic structure as well as create an iron phase morphology change. The strontium content also creates a non-wetting monolayer of strontium atoms on the surface of a molten casting, preventing die soldering, even at very low iron contents. Such changes facilitate feeding through the aluminum interdendritic matrix. This, in turn, creates finished cast products with extremely low levels of microporosity defects. The alloys may be used to die cast or lost foam cast (with or without pressure) engine blocks for marine outboard and stern drive motors.

U.S. Pat. Nos. 9,109,271 and 9,650,699 disclose nickel containing aluminum silicon alloys that are preferably used with a die cast process resulting in castings that have a highly refined primary silicon microstructure with a modified eutectic structure and are highly ductile, but avoid soldering to the die casting dies.

One of the engine areas that traditionally adds significant weight are structures called bulkheads and generally include a crankcase bedplate and crankcase cover and define a crankcase. These structures support the crankshaft and carry substantial engine operating loads with large temperature fluctuations, and therefore need to be strong and durable. In regard to engine design, and more particularly to crankcase design, the following patents are of note.

U.S. Pat. No. 9,457,881 discloses outboard marine engines that have an engine block; a crankcase on the engine block; a crankshaft disposed in the crankcase for rotation about a crankshaft axis; a cover on the crankcase; a bedplate disposed between the engine block and the cover, the bedplate having a plurality of bearings for supporting rotation of the crankshaft; and a cooling water jacket that extends parallel to the crankshaft axis along a radially outer portion of the plurality of bearings. The cooling water jacket carries cooling water for cooling the plurality of bearings and at least one oil drain-back area is located adjacent to the cooling water jacket. The at least one oil drain-back area drains oil from the crankcase.

U.S. Pat. No. 9,616,987 discloses a marine engine that includes a cylinder block having first and second banks of cylinders that are disposed along a longitudinal axis and extend transversely with respect to each other in a V-shape so as to define a valley therebetween. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,234,457 discloses a balance shaft arrangement for a marine engine having a crankshaft supported for rotation about a crankshaft axis and a drive gear supported for rotation with the crankshaft. The balancing arrangement has at least one balance shaft, and a driven gear being driven into rotation by the drive gear, the driven gear being connected to the balance shaft so as to drive the balance shaft into rotation. The driven gear is selectively radially positionable towards and away from the drive gear. A dampening member is disposed between the driven gear and the balance shaft, the dampening member accommodating radial positioning of the driven gear with respect to the balance shaft.

When bulkheads are made thinner though the use of an aluminum alloy, the amount of material used in the block itself is reduced and the crankshaft is allowed to be shorter, thereby reducing the amount of dense steel in the engine. Thinner bulkheads also reduce the overall engine length which saves additional weight elsewhere in the block and in parts like camshafts.

One of the problems with thinner bulkheads in aluminum engine blocks, however, is that smaller diameter, often longer, carbon steel "main" bolts are used to screw into the bulkheads to attach a bedplate. These thinner, longer carbon steel bolts have more highly stressed thread engagement with the aluminum bulkhead compared to the larger diameter bolts used with traditional thicker bulkheads. When an engine heats up during operation, a substantial problem arises due to the difference in the coefficient of thermal expansion between the aluminum bulkheads and the carbon steel bolts. The aluminum wants to expand more than the carbon steel bolt, and it creates high stresses in the aluminum at the last engaged threads of the carbon steel bolt. When these stresses are superimposed upon the operating loads of the engine, the bulkheads can crack and the engine block fails.

SAE Paper 2010-01-0965 discloses studies conducted on bolt relaxation and fatigue prediction on carbon steel bolts and threads in A380 die cast aluminum engine structures. The paper notes that the implementation of the die cast aluminum presents challenges related to material strength and stiffness in highly loaded applications, including clamp load loss in bolted joints between cylinder blocks and cylinder head joints. The authors measured load loss of carbon steel bolts in A380-T5 die cast cylinder blocks at a 15-30% loss. The authors developed a model to measure and predict bolt load relaxation that can be used for predicting operating stresses and fatigue safety factors in threaded roots of the A380 die cast aluminum.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain examples, and most generally, a fastening structure for securing two disparate sections of a product are disclosed. The fastening structure includes a first aluminum silicon alloy product section having at least one hole; a second aluminum silicon alloy product section having at least one hole; and a precipitation hardenable austenitic stainless steel bolt engaging each hole of the first and second aluminum silicon alloy product sections. The precipitation hardenable austenitic stainless steel bolt fastens the first aluminum silicon alloy product section to the second aluminum silicon alloy product section.

In one embodiment, each hole of the first and second aluminum silicon alloy product sections is a threaded hole having threads, and the precipitation hardenable austenitic stainless steel bolt is a threaded bolt that engages the threads of each hole of the first and second aluminum silicon alloy product sections. In another embodiment, wherein the precipitation hardenable austenitic stainless steel bolt is a threaded bolt and the fastening structure further comprises a nut that engages the threads of precipitation hardenable austenitic stainless steel bolt. Here the holes in the aluminum silicon alloy product sections may be threaded or not threaded. In yet another embodiment, each hole of one of either the first or second aluminum silicon alloy product sections is a threaded hole having threads, and the precipitation hardenable austenitic stainless steel bolts are threaded bolts that engage the threads of the each threaded hole.

The precipitation hardenable austenitic stainless steel bolt may be formed from A286 alloy. The first and second aluminum silicon alloy product sections may be formed from a strontium containing aluminum silicon alloy; alternatively the first and second aluminum silicon alloy product sections may be formed from a nickel and strontium containing aluminum silicon alloy. In one embodiment, the first and second aluminum silicon alloy product sections are formed from AA 362.0 alloy. The first aluminum silicon alloy product section may be a crankcase bedplate for an engine block, while the second aluminum silicon alloy product section may be a crankcase cover for an engine block. Alternatively, the first aluminum silicon alloy product section may be an engine block, while the second aluminum silicon alloy product section may be a crankcase bedplate for an engine block.

The fastening structure is optimally utilized in a high temperature environment having thermal fluctuations. In such environments, the precipitation hardenable austenitic stainless steel bolt has less than 15% thermal relaxation after thermal fluctuations, and in some embodiments, less than 13% thermal relaxation after thermal fluctuations.

In other examples, the present application relates to an engine block crankcase utilized in high temperature environments having thermal fluctuations. The engine block crankcase includes an engine block having a plurality of holes, a crankcase bedplate formed from an aluminum silicon alloy and a first plurality of holes corresponding to the plurality of holes in the engine block and a second plurality of holes, and a crankcase cover formed from an aluminum silicon alloy and having a plurality of holes corresponding to the second plurality of holes in the crankcase bedplate. The engine block, the crankcase bedplate and crankcase cover define the crankcase. A crankshaft is disposed in the crankcase. A first and second plurality of threaded bolts constructed of precipitation hardenable austenitic stainless steel secure together the engine block, crankcase bedplate and crankcase cover. Each hole of one of either the holes of the crankcase cover or the second plurality of holes of the crankcase bedplate is a threaded hole having threads, and the first plurality of bolts engage the threads of the each hole. Similarly, each hole of one of either the holes of the engine block or the first plurality of holes of the crankcase baseplate is a threaded hole having threads, and the second plurality of bolts engage the threads of the each hole to secure the engine block to the bedplate. When secured together, the engine block, crankcase bedplate and crankcase cover retain the crankshaft therein.

In one embodiment of this example, the precipitation hardenable austenitic stainless steel bolt may be formed from A286 alloy. The first and second plurality precipitation hardenable austenitic stainless steel bolts have less than 15% thermal relaxation after thermal fluctuations, and the bolts may have less than 13% thermal relaxation after thermal fluctuations. The engine block, crankcase bedplate and the crankcase cover may be formed from a strontium containing aluminum silicon alloy; alternatively the engine block, crankcase bedplate and the crankcase cover may be formed from a nickel and strontium containing aluminum silicon alloy. In one embodiment, the engine block crankcase bedplate and the crankcase cover are formed from AA 362.0 alloy.

In yet another example, the applications discloses an engine block crankcase utilized in a high temperature environment having thermal fluctuations where an engine block, a crankcase bedplate and a crankcase cover are formed from AA 362.0 alloy. The engine block has a plurality of holes, while the crankcase bedplate has a first plurality of holes corresponding to the plurality of holes in the engine block and a second plurality of holes. The crankcase cover has a plurality of holes corresponding to the second plurality of holes in the crankcase bedplate. A first and second plurality of threaded bolts constructed of A286 alloy secure together the engine block, crankcase bedplate and crankcase cover. Each hole of one of either the holes of the crankcase cover or the second plurality of holes of the crankcase bedplate is a threaded hole having threads, and the first plurality of bolts engage the threads of the each hole. Similarly, each hole of one of either the holes of the engine block or the first plurality of holes of the crankcase baseplate is a threaded hole having threads, and the second plurality of bolts engage the threads of the each hole to secure the engine block to the bedplate. When secured together, the engine block, crankcase bedplate and crankcase cover retain the crankshaft therein. A plurality of threaded bolts constructed of A286 alloy engage threads of each hole on the engine block, crankcase bedplate and crankcase cover to secure the bedplate to the engine block and cover and retain the crankshaft therein such that during operation the threaded bolts have less than 15% thermal relaxation after thermal fluctuations.

BRIEF DESCRIPTION OF THE DRAWINGS

Examples of apparatuses for outboard marine engines are described with reference to the following drawing figures. The same numbers are used throughout the drawing figures to reference like features and components.

DETAILED DESCRIPTION OF THE DRAWINGS

Figure 1:
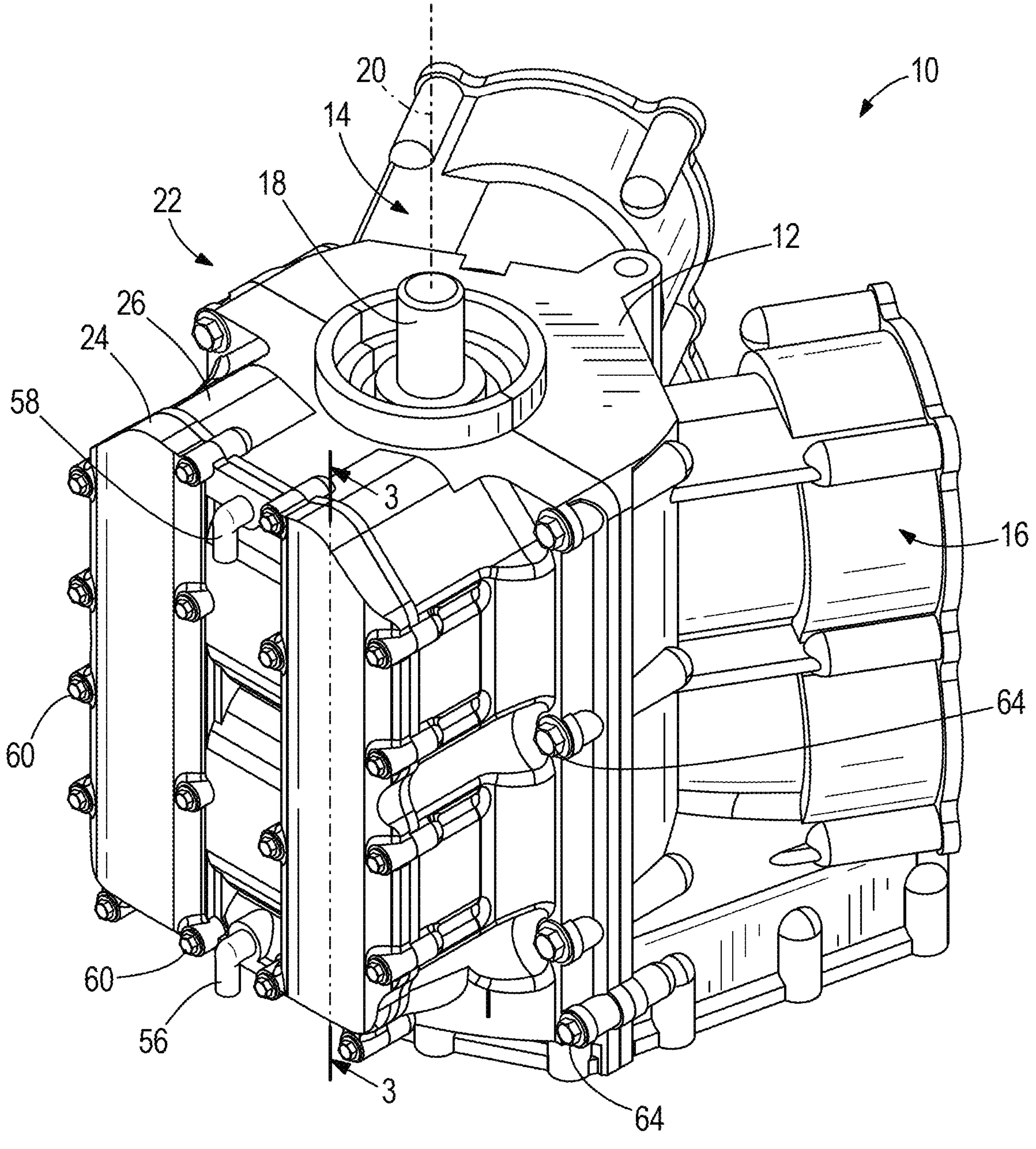
FIG. 1 is a perspective view of a first example of an outboard marine engine, including an engine block, bedplate, and cover assembly.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. § 112 (f), only if the terms "means for" or "step for" are explicitly recited in the respective limitation.

Most generally, the present application relates to a fastening structure for securing two or more disparate sections, [e.g. 12, 24, 26 (FIG. 2)], of a product 10. The fastening structure includes a first aluminum silicon alloy product section, e.g. 26, having at least one hole 66 and a second aluminum silicon alloy product section, e.g. 12, having at least one corresponding hole 15. A precipitation hardenable austenitic stainless steel bolt 64 engages each hole of the first and second aluminum silicon alloy product sections to secure them together. In other words, one or more of the precipitation hardenable austenitic stainless steel bolts 64 fastens the first aluminum silicon alloy product section to the second aluminum silicon alloy product section. The afore-described holes, e.g. 15, 66, may be threaded holes, or they may not have threads, but either one of the holes in the first or second product sections are typically threaded. In this instance, the precipitation hardenable austenitic stainless steel bolts are threaded and engage the threads in either the first or second products. Alternatively, the holes may be unthreaded, and the precipitation hardenable austenitic stainless steel bolt is threaded and the fastening structure further comprises a nut [not shown] that engages the threads of precipitation hardenable austenitic stainless steel bolt, in a manner that is well known in the art. In yet another alternative, each hole of one of either the first or second aluminum silicon alloy product sections is a threaded hole having threads. The precipitation hardenable austenitic stainless steel bolts are threaded bolts that engage the threads of the each threaded hole. As described herein, the precipitation hardenable austenitic stainless steel bolt may be formed from A286 alloy.

Figure 2:
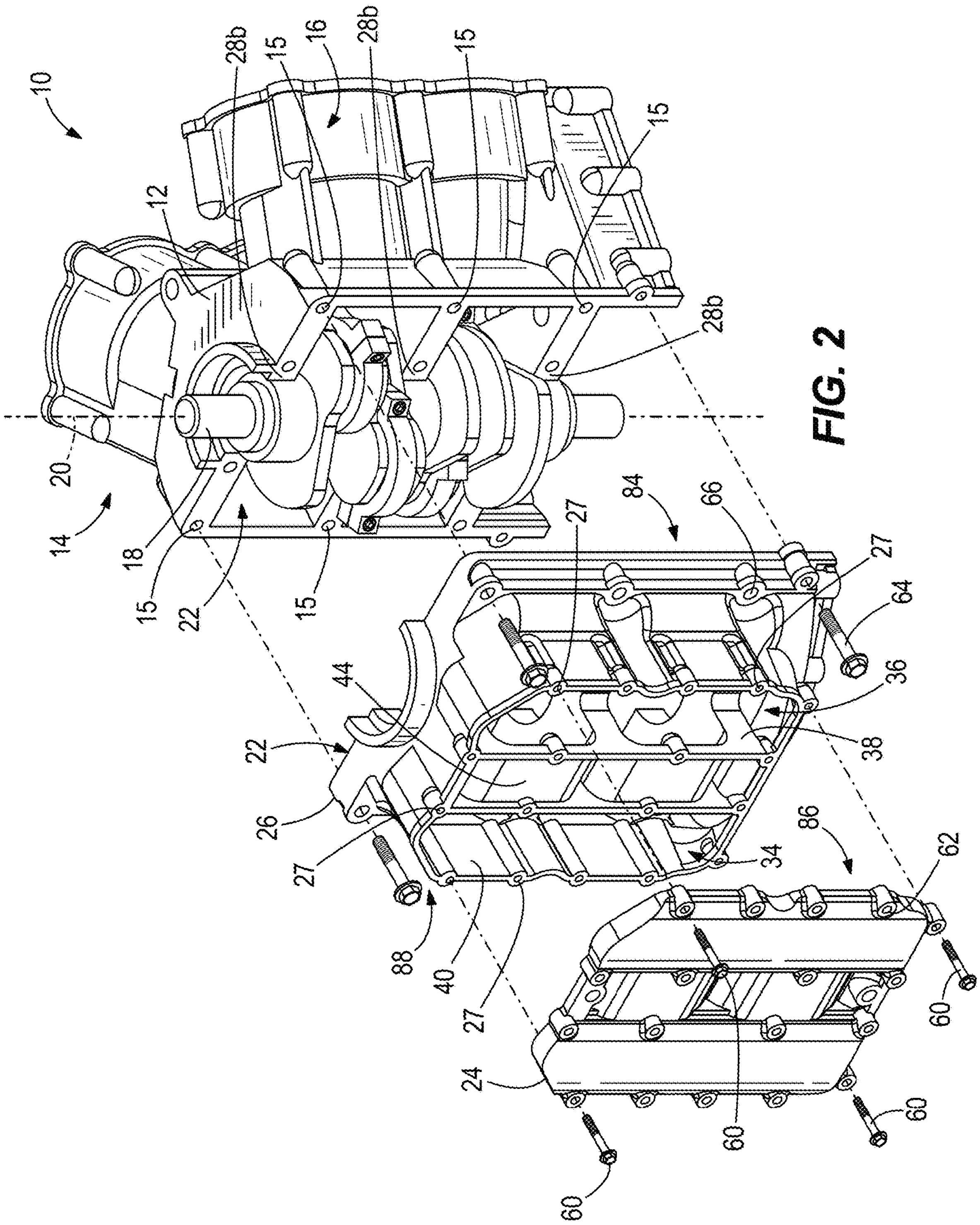
FIG. 2 is an exploded view of the assembly of FIG. 1.
Figure 3:
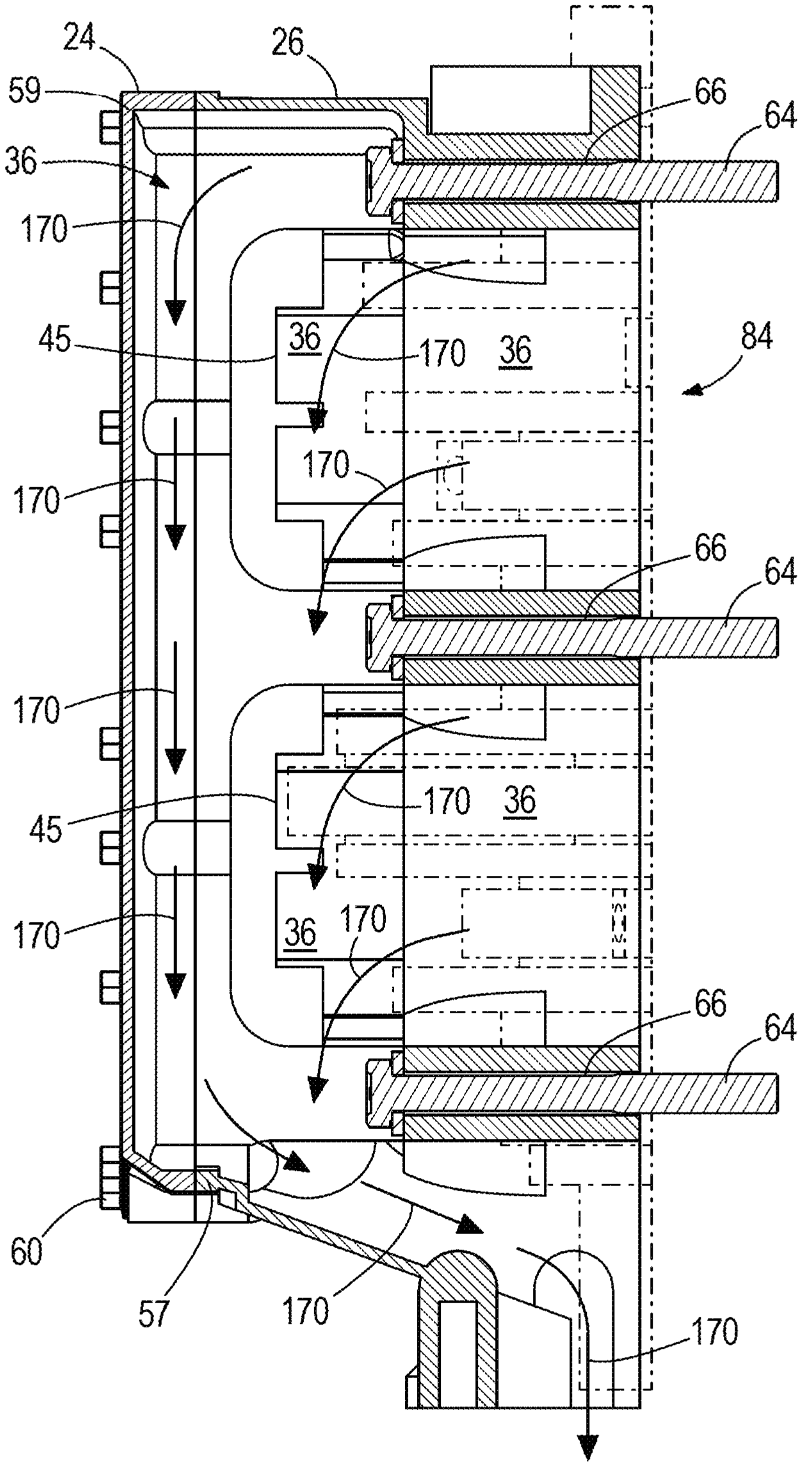
FIG. 3 is a view of section 3-3, taken in FIG. 1.

FIGS. 1-3 depict one example of securing aluminum silicon alloy product sections together. An outboard marine engine 10 includes an engine block 12 on which first and second rows of vertically-aligned piston-cylinders 14, 16 are mounted transversely to each other in a conventional V-style orientation. The example shown in FIGS. 1-3 is a 4-cylinder arrangement; however the concepts of the present disclosure are equally applicable to single cylinder engine arrangements, and engine arrangements having more piston-cylinders, such as 6-cylinder examples, 8-cylinder examples, and/or the like. The concepts of the present disclosure are equally applicable to incline engines, boxer engines and/or the like. Combustion within the first and second rows of aligned piston-cylinders 14, 16 induces reciprocal movement of connecting rods (not shown), which causes rotation of a crankshaft 18 about its crankshaft axis 20. The crankshaft 18 is disposed in a crankcase 22 on the engine block 12. A cover 24 is provided on the crankcase 22. A bedplate 26 is disposed between the engine block 12 and the cover 24. The bedplate 26 has a radially inner side 84 and a radially outer surface 88. The cover has a radially inner surface 86 that is fastened to the radially outer surface 88 of the bedplate. The bedplate 26 and the cover 24 at least partially define the extent of the crankcase 22 in which the crankshaft 18 is disposed. As shown in FIG. 2, the bedplate 26 defines part of a plurality of vertically aligned bearings 28*b* for supporting rotation of the crankshaft 18. In this example, the bedplate 26 forms a radially outer first half of the plurality of bearings 28*b* and the engine block 12 defines a radially inner second half of the plurality of bearings 28*b*.

The cover 24 is connected to the bedplate 26 by bolts 60 that extend through bolt holes 62 in the cover 24 and thread into the bedplate 26. The bedplate 26 is connected to the engine block 12 by bolts 64 that extend through bolt holes 66 in the bedplate 26. To maintain clarity on the drawings, not all the bolts 60, 64 and bolt holes 62, 66 are numbered.

As is known in the art, a cooling water jacket is utilized to surround and cool the engine cylinders 14, 16 and crankshaft 18. By way of example, and without limitation, FIG. 2 shows an outwardly directed cooling water jacket surface 44 is provided by the bedplate 26 and an inwardly directed cooling water jacket surface (not shown) is provided by the cover 24. As shown in FIG. 1, a cooling water inlet 56 is located at a lower end of the cooling water jacket, while a cooling water outlet 58 is located at an upper end of the cooling water jacket. Cooling water flows vertically upwardly through the cooling water jacket from the cooling water inlet 56 to the cooling water outlet 58. The bedplate 26 also has opposing inner and outer sidewalls 38, 40 that partially define first and second oil drain-back areas 34, 36. The cover 24 has inner oil draining surfaces that are located on opposite sides from each other with respect to the cooling water jacket and partially define the first and second oil drain-back areas 34, 36.

As shown in FIGS. 1 and 3, the cooling water inlet 56 is located at one (e.g., the lower) end 57 of the crankcase 22 and the cooling water outlet 58 is located at the opposite (e.g., the upper) end 59 of the crankcase 22. A plurality of scraper surfaces 45 extend radially inwardly from the bedplate 26 towards the crankshaft 18 and catch oil that is thrown by the crankshaft 18 during its rotation. As shown at arrows 170, the oil drains by gravity, vertically downwardly to a sump (not shown) located below the engine block 12. Additional relevant engine structure and alternative designs are disclosed in U.S. Pat. Nos. 9,457,881 and 9,616,987, also owned by the assignee of the present application, the entirety of which are incorporated herein by reference.

Figure 4:
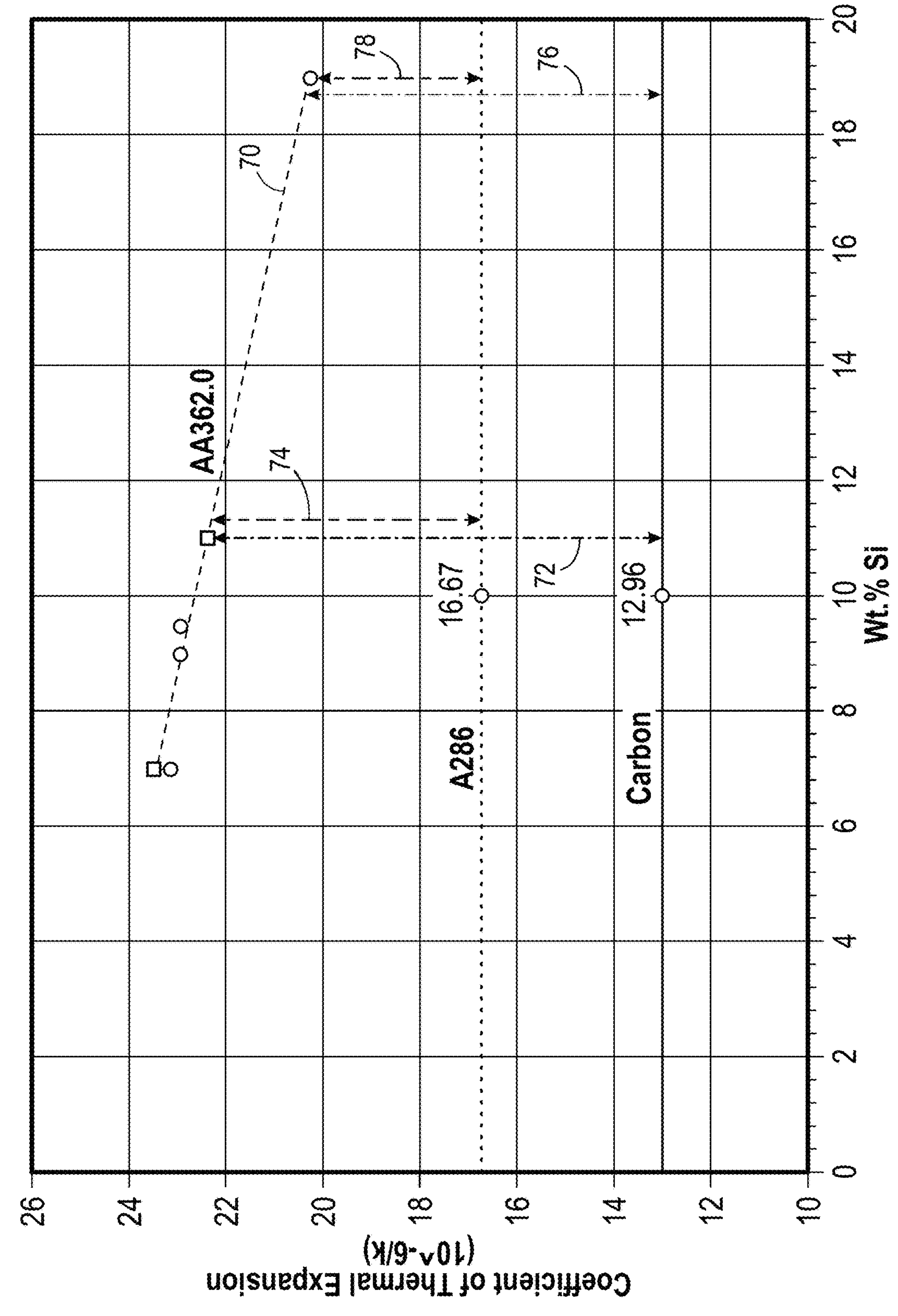
FIG. 4 is a graph of the coefficient of thermal expansion for AA 362.0 alloy, a high Si and Ni and Sr containing aluminum alloy, other aluminum alloys, and certain steels at 160° C. temperature.

The coefficient of thermal expansion of aluminum alloys used for an exemplary engine block 12 depends primarily on the Silicon (Si) content of the aluminum alloy. As the percentage of Si increases, the coefficient of thermal expansion decreases. This is represented by dotted line 70 the graph of FIG. 4 which serves as the baseline for comparison to alloys proposed to be used in manufacturing appropriate bolts 60, 64. In one embodiment, the strontium-containing eutectic AA362.0 alloy is utilized and has a co-efficient of the thermal expansion of 22.374×10-6/K for the average composition. Other similar strontium containing aluminum silicon alloys may be utilized such as those disclosed in U.S. Pat. Nos. 6,923,935, 7,347,905, and 7,666,353, incorporated herein by reference. Alternatively, nickel and strontium containing aluminum silicon alloys of the type disclosed in U.S. Pat. Nos. 9,109,271 and 9,650,699, also incorporated herein by reference, may be utilized.

Prior to the present invention, carbon steel bolts with a coefficient of thermal expansion of 12.96×10-6/K were threaded into bolt holes 27, 15 formed in thin (22 mm) bulkheads made from the A362.0 alloy. The difference in thermal expansion of 9.4×10-6/K, is believed to contribute significantly to the cracking of engine blocks 12 during engine durability testing. This difference is demonstrated by arrow 72 in the graph of FIG. 4. Indeed, internal testing by the inventors revealed nearly a 41% failure rate of engine blocks 12 constructed in this manner.

The failure of the engine block 12 at the threaded holes 15 in bulkheads in aluminum alloy engines has been analyzed and from many different angles. Traditionally, prior aluminum alloy covers 24, bedplates 26, and bulkheads were thicker and had room for larger diameter carbon steel bolts that engage threaded bulkhead holes 15 resulting in lower stresses in the threads and the ability to spread engine operating and thermal loads over more material. While failure is lower, the engine weighs more, and this defeats the purpose of utilizing the lighter aluminum alloy material in the first place. Moreover, when the preferable thinner aluminum covers 24, bedplates 26, and bulkheads are utilized, the larger diameter carbon steel bolts that engage the threaded holes 15 in the thin bulkheads are not optimal for the engine geometry. Essentially, there is too little supporting aluminum around the large threaded bulkhead holes 15.

Another approach has been to remove material from the center of the end of a carbon steel bolt 60, 64. This removal can reduce the stiffness or section modulus of the bolt and make it less stiff when interacting with the aluminum alloy. Thus, while this solution has some potential for limited effectiveness, it is not an optimal solution as it did not increase the life of silicon containing aluminum alloy engines.

Some racing engines change the orientation of bolts as they extend through bolt holes 66 in the bedplate 26 at an angle into the block 12, resulting in splayed bolts. If the ends of the bolts can be in a cooler region of the engine, and the orientation of the engine operating loads can be known quite well, this approach can also be effective. Machining bolt holes 15 into blocks on angles, however, can be more difficult than machining perpendicular to flat surfaces, as shown in FIGS. 1-3. It is also harder to install the bolts on a production line. Thus, this solution is also not optimal.

During research and experimentation, the inventors realized that the difference of coefficient of thermal expansion between an aluminum engine block 12 alloy and steel bolts 60, 64 is fundamental to the issue of failure of the engine blocks 12. For some time, the focus on the industry has been to modify the aluminum base (i.e. the alloy of the engine block 12) to change to a lower coefficient of thermal expansion aluminum alloy to minimize the difference with the traditional carbon steel bolt 60, 64. One of the inventors named herein has designed aluminum alloys that have particular utility in addressing this situation as shown in U.S. Pat. Nos. 9,109,271 and 9,650,699, incorporated herein by reference. As discussed therein, these alloys have quite low coefficients of thermal expansion and excellent high temperature strength. Additionally, aluminum alloys with lower coefficients of thermal expansion such as the hypereutectic Al—Si 390.1 and 391.1 alloys are used today to manufacture engines. These silicon containing aluminum alloys, however, are more expensive and require significantly more processing to form the alloys into aluminum engine blocks 12.

Recognizing that the coefficient of thermal expansion problem would not be readily solved by modifying the base aluminum alloy, the inventors turned to potential modifications of the carbon steel bolts 60, 64. Specifically, the inventors investigated reducing the difference in thermal expansion between the bolt and any aluminum block material to equal to or less than 5.7×10-6/K by using a bolt with a higher coefficient of thermal expansion compared to carbon steel. The coefficients of thermal expansion are measured at the maximum engine operating oil temperature of the engine so that the bolt and mating aluminum tend to expand and contract to a more similar degree during engine operation. The inventors evaluated numerous materials in an effort to find a material with adequate mechanical properties and the proper level of the coefficient of thermal expansion. The inventors considered titanium alloys, carbon steel alloy variants, stainless steels, nickel based superalloys, cobalt based alloys, aluminum silicon alloys and copper base alloys.

In exploring stronger versions of these materials, a highly unforeseen consequence arose. For certain materials, and particularly austenitic stainless steel alloys, they must be cold worked in order for the strength of the final product to be increased. While it was possible to strengthen most of these alloys to meet the mechanical property requirements at the desired design size of the fasteners so that the engine does not get any larger, the cold working process altered the coefficient of thermal expansion of these materials. In the cold worked condition where the strength is at the required level, the coefficient of thermal expansion decreased to the point that is was only as good as the carbon steel bolt that these were designed to replace. Therefore, there was no advantage of using these materials as fasteners to address this issue.

One relatively rare alloy family, the precipitation hardenable austenitic stainless steel alloys that can meet these diverse requirements. Within the family of precipitation hardenable austenitic stainless steel alloys, one alloy that has shown particular utility for main bolts in AA 362.0 aluminum alloy engines is A286 stainless steel. While stainless steel that is generally considered too weak for engine securement applications, it is used in unique corrosion resistant applications or direct flame impingement situations. Here, stainless steel, and particularly precipitation hardenable austenitic stainless steel alloys such as A286 were not apparent because the application is a highly non-corrosive environment—the bolts 60, 64 in securing the covers 24 and bedplate 26 are held in an engine oil-rich environment. Moreover, A286 is an expensive alloy to manufacture bolts from, and the bolts in general are typically constructed from a material that has very little thermal expansion. Thus, it was counter-intuitive for the inventors to look to stainless steels, much less particularly precipitation hardenable austenitic stainless steel alloys such as A286 as a fastening option, and bolts constructed of A286 were not readily available in part because of the non-optimal thermal expansion characteristics.

Nonetheless, when A286 bolts with a thermal expansion of 16.67×10-6/K were tested and used, the failure rate of the engine blocks 12 made of AA 362.0 aluminum alloy in durability testing unexpectedly plunged to 0%. The difference in coefficient of thermal expansion of 5.7×10-6/K between the AA 362.0 engine block 12 and the A286 bolts 60, 64 is demonstrated by arrow 74 in FIG. 4 and is significant. Lines 76 and 78 of FIG. 4 demonstrate the difference in the coefficients of thermal expansion between traditional carbon steel bolts 76 and A286 bolts 78 when the alloy to be fastened is a high silicon nickel and strontium containing alloy.

As shown in the EXAMPLES below, the clamp load retention of an A286 bolt was dramatically better than traditional carbon steel bolts. In other words, the A286 bolts loosen far less in service compared to traditional carbon steel bolts. The inventors contemplate that this is due to the small delta in thermal expansion between the AA 362.0 engine block material and the A286 bolts. This solution provides a novel, production-relevant, material-based solution for preventing cracking of lightweight aluminum silicon alloy engine blocks, and may be more generally applied to the fastening of aluminum silicon alloys in high temperature environments.

Accordingly, and referring again to FIGS. 1-3, an engine block crankcase 22 is disclosed that may be utilized in high temperature environments having thermal fluctuations. The engine block crankcase 22 includes an engine block 12 having a plurality of holes 15, a crankcase bedplate 26 formed from an aluminum silicon alloy and a first plurality of holes 66 corresponding to the plurality of holes 15 in the engine block 12 and a second plurality of holes 27, and a crankcase cover 24 formed from an aluminum silicon alloy and having a plurality of holes 62 corresponding to the second plurality of holes 27 in the crankcase bedplate 26. The engine block 12, the crankcase bedplate 26 and crankcase cover 24 define the crankcase 22. A crankshaft 18 is disposed in the crankcase 22. A first and second plurality of threaded bolts 60, 64 constructed of precipitation hardenable austenitic stainless steel such as A 286 alloy secure together the engine block 12, crankcase bedplate 26 and crankcase cover 24 together. Each hole of one of either the holes of the crankcase cover 62 or the second plurality of holes 27 of the crankcase bedplate 26 is a threaded hole having threads, and the first plurality of bolts 60 engage the threads of the each hole 62, 27. Similarly, each hole 15, 66 of one of either the holes 15 of the engine block 12 or the first plurality of holes 66 of the crankcase baseplate 26 is a threaded hole having threads, and the second plurality of bolts 64 engage the threads of the each hole 15, 66 to secure the engine block 12 to the bedplate 26. When secured together, the engine block 12, crankcase bedplate 26 and crankcase cover 24 retain the crankshaft 18 therein.

The first plurality 60 and second plurality 64 of precipitation hardenable austenitic stainless steel bolts have less than 15% thermal relaxation after thermal fluctuations. The bolts 60, 64 may have less than 14% or 13% thermal relaxation after thermal fluctuations. The engine block 12, crankcase bedplate 26 and the crankcase cover 24 may be formed from a strontium containing aluminum silicon alloy of the type disclosed in U.S. Pat. Nos. 6,923,935, 7,347,905, and 7,666,353. Alternatively the engine block 12, crankcase bedplate 26 and the crankcase cover 24 may be formed from a nickel and strontium containing aluminum silicon alloy of the type disclosed in U.S. Pat. Nos. 9,109,271 and 9,650,699. In one embodiment, the engine block 12, crankcase bedplate 26 and the crankcase cover 24 are formed from AA 362.0 alloy.

Example 1

Figure 5:
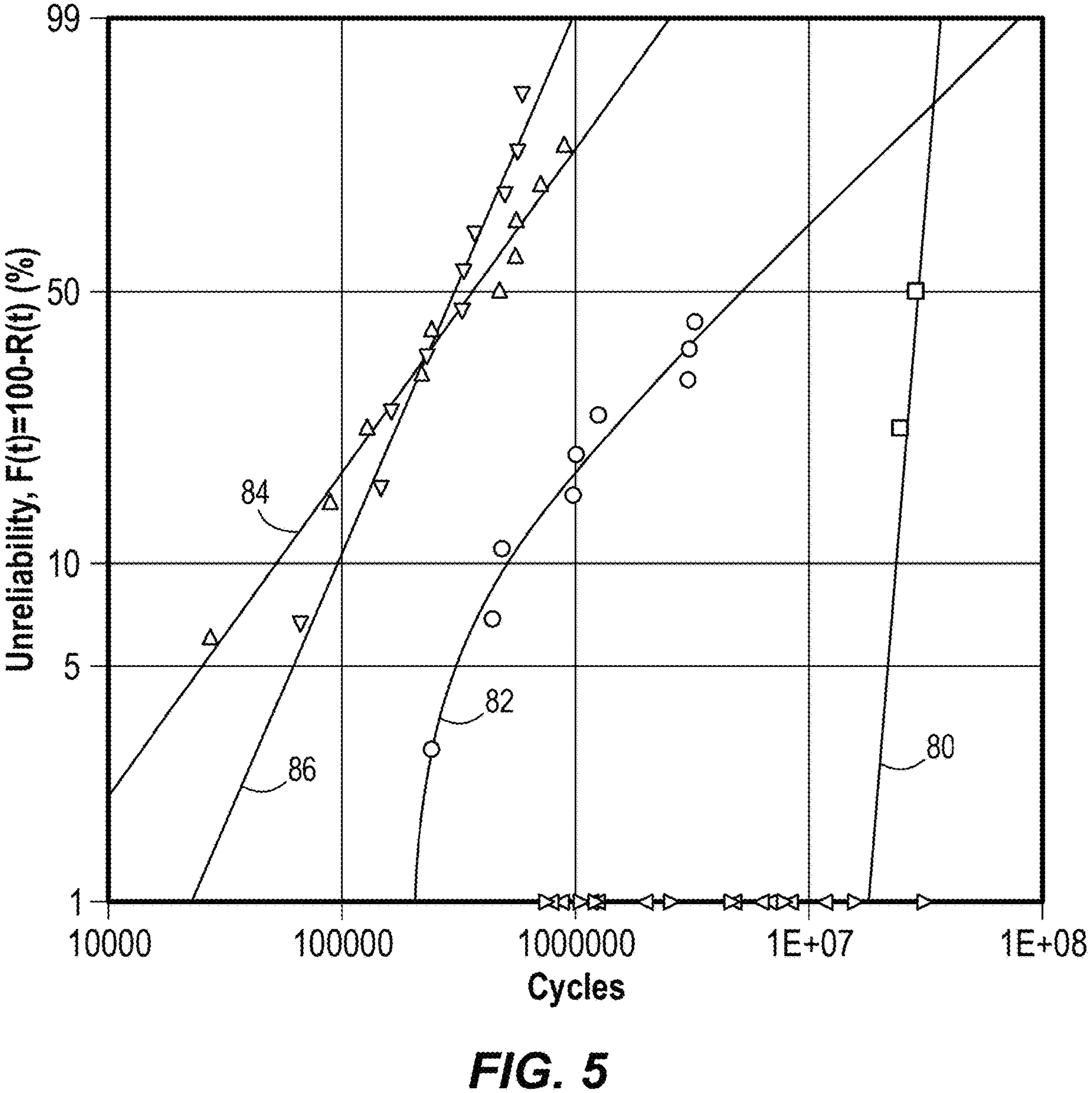
FIG. 5 is a fatigue test graph demonstrating the cycles to failure of fasteners cast from different materials.

A component level fatigue test was also conducted to show the enhanced clamp load retention of the invention. Aluminum alloy samples of AA 362.0 alloy were extruded to eliminate as-cast porosity and other discontinuities from the casting process that could increase material property variation. Samples were machined to 17.4 mm diameter to approximate the width of a thin engine bulkhead. The samples were form thread tapped, and thermally conditioned to reduce residual stress in the aluminum alloy. Carbon steel bolts and A286 stainless steel bolts were threaded into the aluminum samples and the assemblies were fatigue tested at 160° C., the maximum design oil temperature for engines of the type described above. FIG. 5 demonstrates that the A286 bolt, represented by line 80, had substantially longer life compared to any of the assemblies with carbon steel bolts represented by lines 82, 84 and 86 in FIG. 5.

Example 2

Figure 6A:
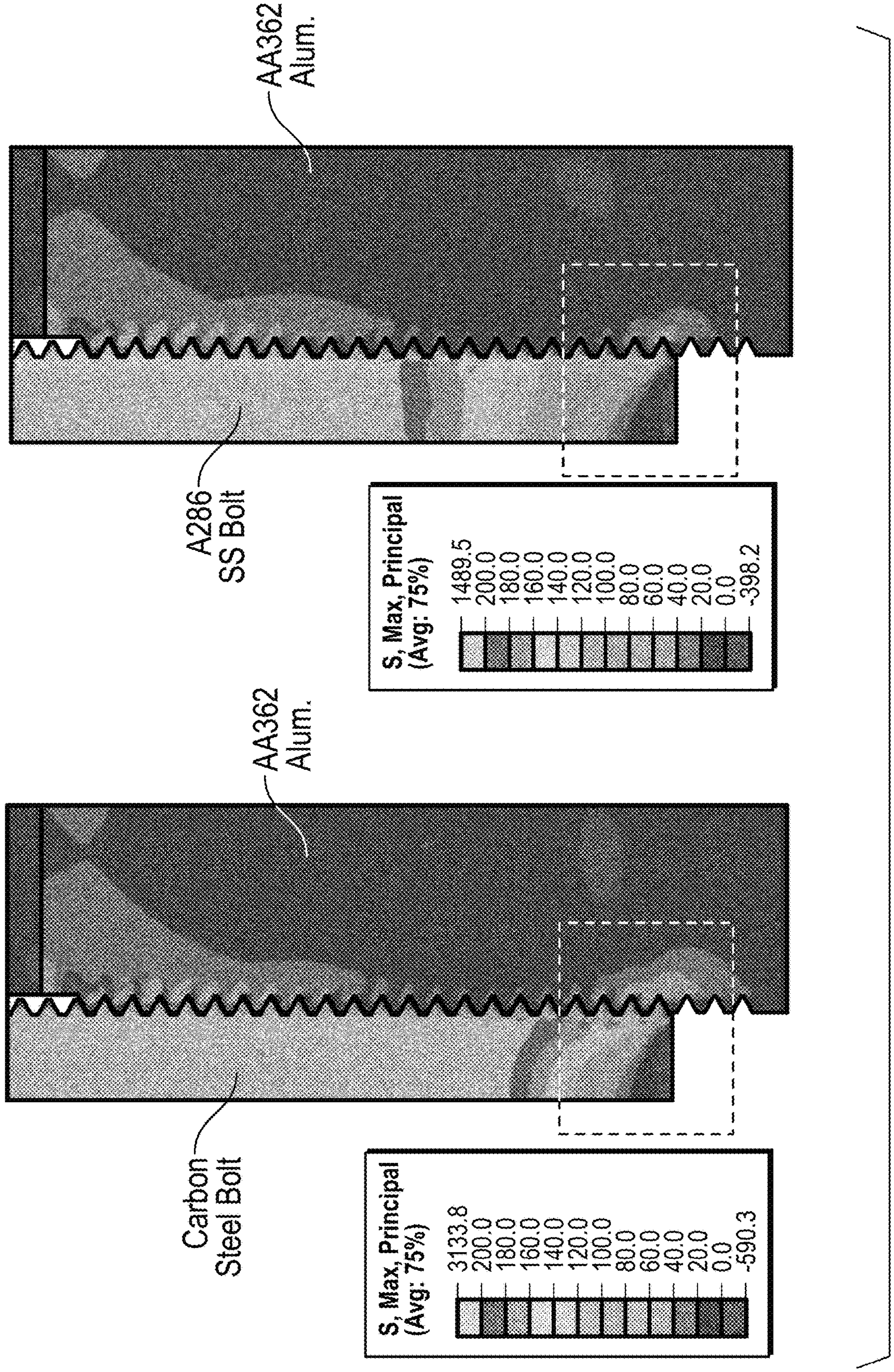
FIGS. 6A-6C are graphical depictions of maximum principal stress of a bolted joint at 145° C. comparing stress of a joint bolted with a carbon steel bolt versus an A286 bolt.
Figure 6B:
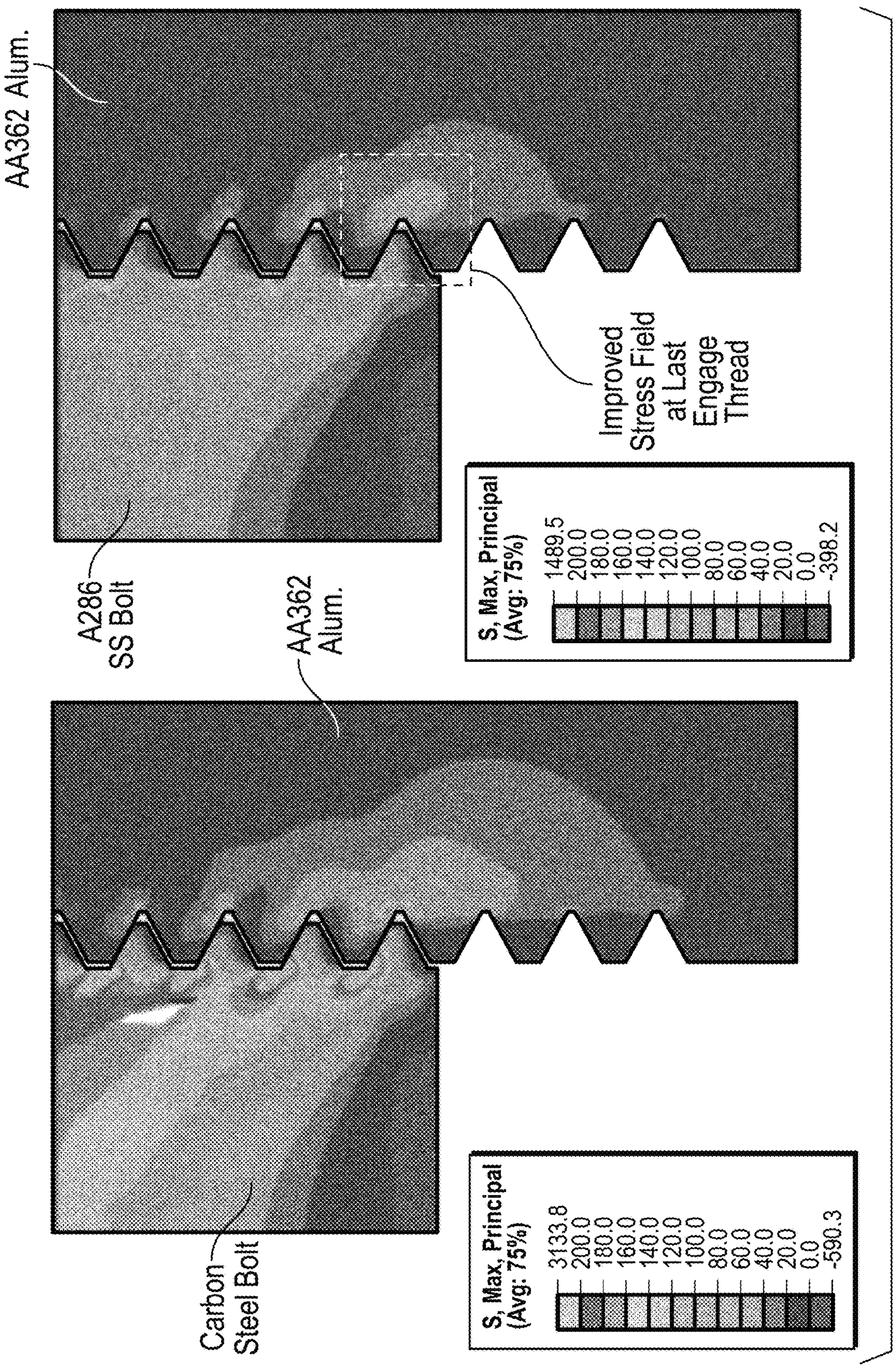
Figure 6C:
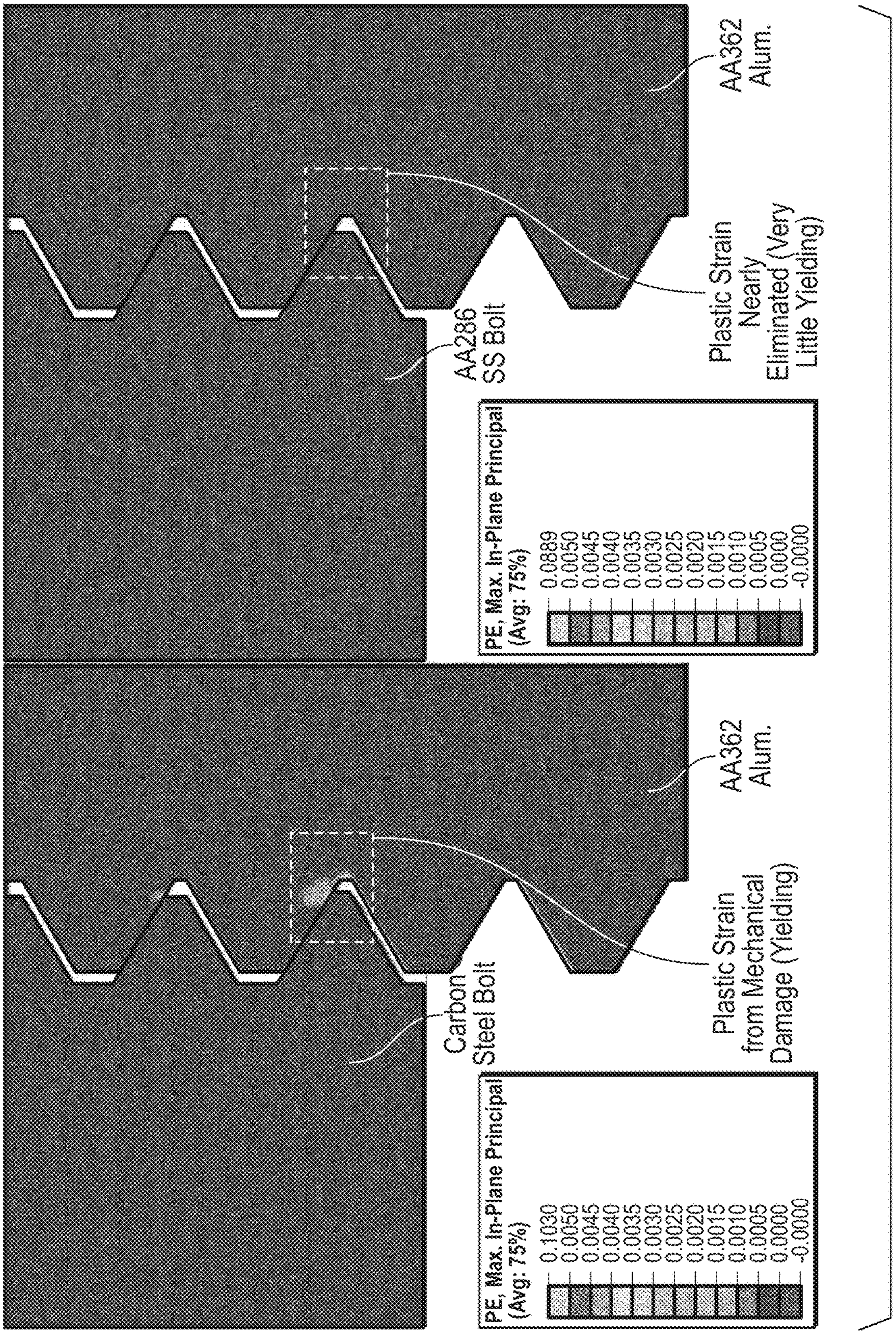
Figure 7:
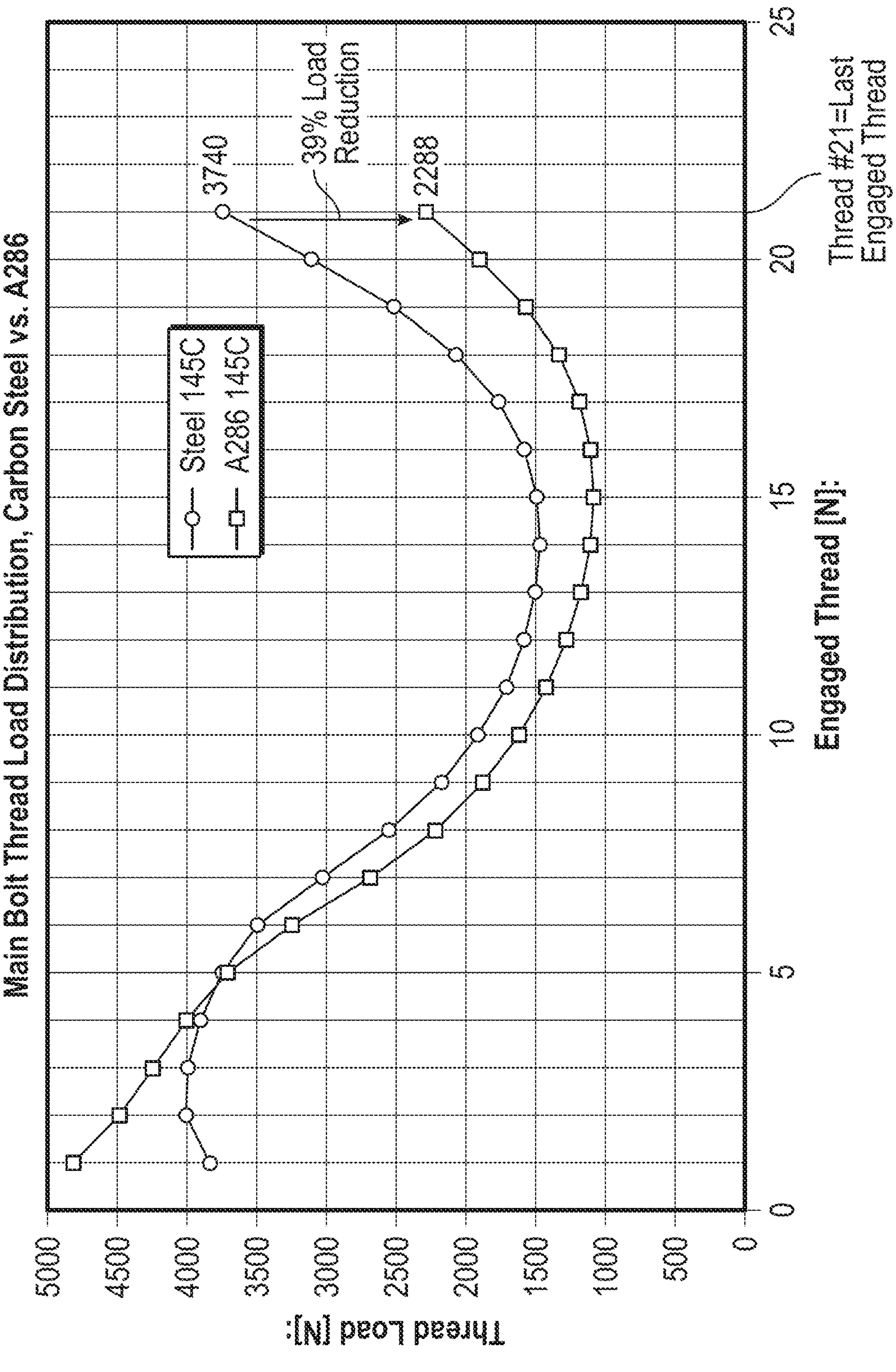
FIG. 7 is a thread load distribution graphs graph comparing thread load of a joint bolted with a carbon steel bolt versus an A286 bolt.

Finite element analysis of both traditional carbon steel bolts and A286 bolts into AA 362.0 alloy engine blocks was also conducted to demonstrate clamp load retention. As shown in FIGS. 6A through 6B, it was determined that the higher coefficient of thermal expansion of A286 significantly improved the stress field in the aluminum at the last engaged thread. The resulting contour plot of FIG. 6C demonstrates that the carbon steel bolt results in substantial mechanical damage (yielding) compared to the A286 bolt where the plastic strain is nearly eliminated. The improvement in stress and plastic strain demonstrated in FIG. 7 may be attributed to a reduction in load due to the reduced difference in the coefficient of thermal expansion between the A286 bolt and aluminum block. When the bolt load is evaluated on a per thread basis as shown in FIG. 7, the A286 bolt reduces the load on the last engaged thread by 39% compared to the carbon steel bolt.

Example 3

A clamp load comparison analysis was conducted between traditional carbon steel bolts on AA 362.0 alloy engine blocks versus A286 bolts on AA 362.0 alloy engine blocks. The carbon steel bolts were thermally cycled three times from −40° C. to 145° C. with a 3 hour hold time at each extreme. The A286 bolts were subject to a more severe treatment where the bolts were thermally cycled four times from −40° C. to 145° C. with a 3 hour hold time at each extreme. As demonstrated in TABLES 1-4, below, the A286 bolts had only 12.6% and 10.4% average thermal relaxation, as compared to 19.2% and 15.5% average thermal relaxation for carbon steel bolts. It is important to note that this is in good agreement with research at Chrysler Corporation where clamp load relaxation of 15%-30% was reported for carbon steel fasteners in aluminum silicon alloy engine blocks (SAE Paper 2010-01-0965).

TABLE 1

| | Carbon Steel Fasteners Assembly Specification: 40 Nm + 75* | | |
|---|---|---|---|
| Fastener ID | 2nd Installation Clamp Load (kN) | Post Thermal Clamp Load (kN) | Thermal Relaxation |
| 1 | 43.1 | 34.5 | 20.0% |
| 2 | 43.3 | 36.2 | 16.5% |
| 3 | 47.3 | 37.2 | 21.5% |
| 4 | 47.8 | 38.7 | 19.0% |
| 5 | 47.3 | 37.5 | 20.7% |
| 6 | 47.8 | 37.9 | 20.7% |
| 7 | 47.9 | 39.4 | 17.8% |

TABLE 1-continued

| Carbon Steel Fasteners Assembly Specification: 40 Nm + 75* | | | |
|---|---|---|---|
| Fastener ID | $2^{nd}$ Installation Clamp Load (kN) | Post Thermal Clamp Load (kN) | Thermal Relaxation |
| 8 | 48.2 | 39.6 | 17.8% |
| Average | 46.6 | 37.6 | 19.2% |

TABLE 2

| Carbon Steel Fasteners Assembly Specification: 25 Nm + 60* | | | |
|---|---|---|---|
| Fastener ID | $2^{nd}$ Installation Clamp Load (kN) | Post Thermal Clamp Load (kN) | Thermal Relaxation |
| 1 | 33.9 | 29.2 | 13.7% |
| 2 | 33.3 | 28.4 | 14.8% |
| 3 | 35.2 | 29.6 | 15.9% |
| 4 | 34.6 | 29.0 | 16.2% |
| 5 | 34.5 | 29.2 | 15.4% |
| 6 | 34.7 | 28.7 | 17.5% |
| 7 | 36.2 | 30.9 | 14.7% |
| 8 | 34.2 | 28.8 | 15.6% |
| Average | 34.6 | 29.2 | 15.5% |

TABLE 3

| A286 Stainless Fasteners Assembly Specification: 35 Nm + 60* | | | |
|---|---|---|---|
| Fastener ID | $2^{nd}$ Installation Clamp Load (kN) | Post Thermal Clamp Load (kN) | Thermal Relaxation |
| 1 | 47.4 | 41.6 | 12.4% |
| 2 | 49.6 | 43.5 | 12.3% |
| 3 | 47.4 | 41.6 | 12.4% |
| 4 | 48.1 | 41.9 | 12.9% |
| 5 | 46.2 | 40.6 | 12.2% |
| 6 | 46.9 | 40.9 | 12.8% |
| 7 | 48.7 | 42.4 | 12.9% |
| 8 | 49.2 | 42.9 | 12.8% |
| Average | 47.9 | 41.9 | 12.6% |

TABLE 4

| A286 Stainless Fasteners Assembly Specification: 25 Nm + 45* | | | |
|---|---|---|---|
| Fastener ID | $2^{nd}$ Installation Clamp Load (kN) | Post Thermal Clamp Load (kN) | Thermal Relaxation |
| 1 | 35.9 | 33.2 | 7.3% |
| 2 | 36.4 | 32.8 | 10.0% |
| 3 | 37.4 | 33.6 | 10.3% |
| 4 | 36.9 | 32.7 | 11.4% |
| 5 | 35.9 | 32.4 | 9.7% |
| 6 | 38.8 | 34.3 | 11.6% |
| 7 | 36.6 | 32.5 | 11.3% |
| 8 | 37.8 | 33.5 | 11.4% |
| Average | 37.0 | 33.1 | 10.4% |

What is claimed is:

1. An engine block crankcase utilized in a high temperature environment having thermal fluctuations comprising:

an engine block having a plurality of holes;

a crankcase bedplate formed from an aluminum silicon alloy and having a first plurality of holes corresponding to the plurality of holes in the engine block and a second plurality of holes;

a crankcase cover formed from an aluminum silicon alloy and having a plurality of holes corresponding to the second plurality of holes in the crankcase bedplate, the engine block, crankcase bedplate and crankcase cover defining the crankcase;

a crankshaft disposed in the crankcase; and a first and second plurality of threaded bolts constructed of precipitation hardenable austenitic stainless steel and having a drive nut portion and stem member portion, wherein the first and second plurality of precipitation hardenable austenitic stainless steel bolts have less than 15% thermal relaxation during thermal fluctuations;

wherein each hole of each of the first and second plurality of holes is a threaded hole having threads, and the first plurality of threaded precipitation hardenable austenitic stainless steel bolts engage the threads of each hole of the first plurality of holes the along the stem member portion to secure the crankcase bedplate to the engine block such that the drive nut portion engages the crankcase bed plate, and the second plurality of threaded precipitation hardenable austenitic stainless steel bolts engage the threads of the each hole of the second plurality of holes along the stem member portion to secure the crankcase cover to the crankcase bedplate such that the drive nut portion engages the crankcase cover, and such that the first and second plurality of threaded precipitation hardenable austenitic stainless steel bolts retain the crankshaft therein.

2. The engine block crankcase of claim 1, wherein the first and second plurality of precipitation hardenable austenitic stainless steel bolts are formed from A286 alloy.

3. The engine block crankcase of claim 1, wherein the engine block, crankcase bedplate and the crankcase cover are formed from a strontium containing aluminum silicon alloy.

4. The engine block crankcase of claim 1, wherein the engine block, crankcase bedplate and the crankcase cover are formed from a nickel and strontium containing aluminum silicon alloy.

5. The engine block crankcase of claim 1, wherein the engine block, crankcase bedplate and the crankcase cover are formed from AA 362.0 alloy.

6. The engine block crankcase of claim 1, wherein the first and second plurality of precipitation hardenable austenitic stainless steel bolts have less than 13% thermal relaxation after thermal fluctuations.

7. An engine block crankcase utilized in a high temperature environment having thermal fluctuations comprising:

an engine block having a plurality of holes;

a crankcase bedplate formed from AA 362.0 alloy and having a first plurality of holes corresponding to the plurality of holes in the engine block and a second plurality of holes;

a crankcase cover formed from AA 362.0 alloy and having a plurality of holes corresponding to the second plurality of holes in the crankcase bedplate, the engine block, crankcase bedplate and crankcase cover defining the crankcase;

a crankshaft disposed in the crankcase; and a first and second plurality of threaded bolts constructed of A286 alloy and having a drive nut portion and stem member portion;

wherein each hole of each of the holes of the first and second plurality of holes is a threaded hole having threads, and the first plurality of bolts engage the threads of each hole of the first plurality of holes the along the stem member portion to secure the crankcase bedplate to the engine block such that the drive nut portion engages the crankcase bed plate, and the second plurality of bolts engage the threads of the each hole of the second plurality of holes along the stem member portion to secure the crankcase cover to the crankcase bedplate such that the drive nut portion engages the crankcase cover, and such that the first and second plurality of threaded precipitation hardenable austenitic stainless steel bolt retain the crankshaft therein and wherein during operation the threaded bolts have less than 15% thermal relaxation during thermal fluctuations.

8. The engine block crankcase of claim 7, wherein the first and second plurality of precipitation hardenable austenitic stainless steel bolts have less than 13% thermal relaxation after thermal fluctuations.

* * * * *